April 13, 1954  T. H. WIANCKO  2,675,525
ACCELEROMETER
Filed June 25, 1951
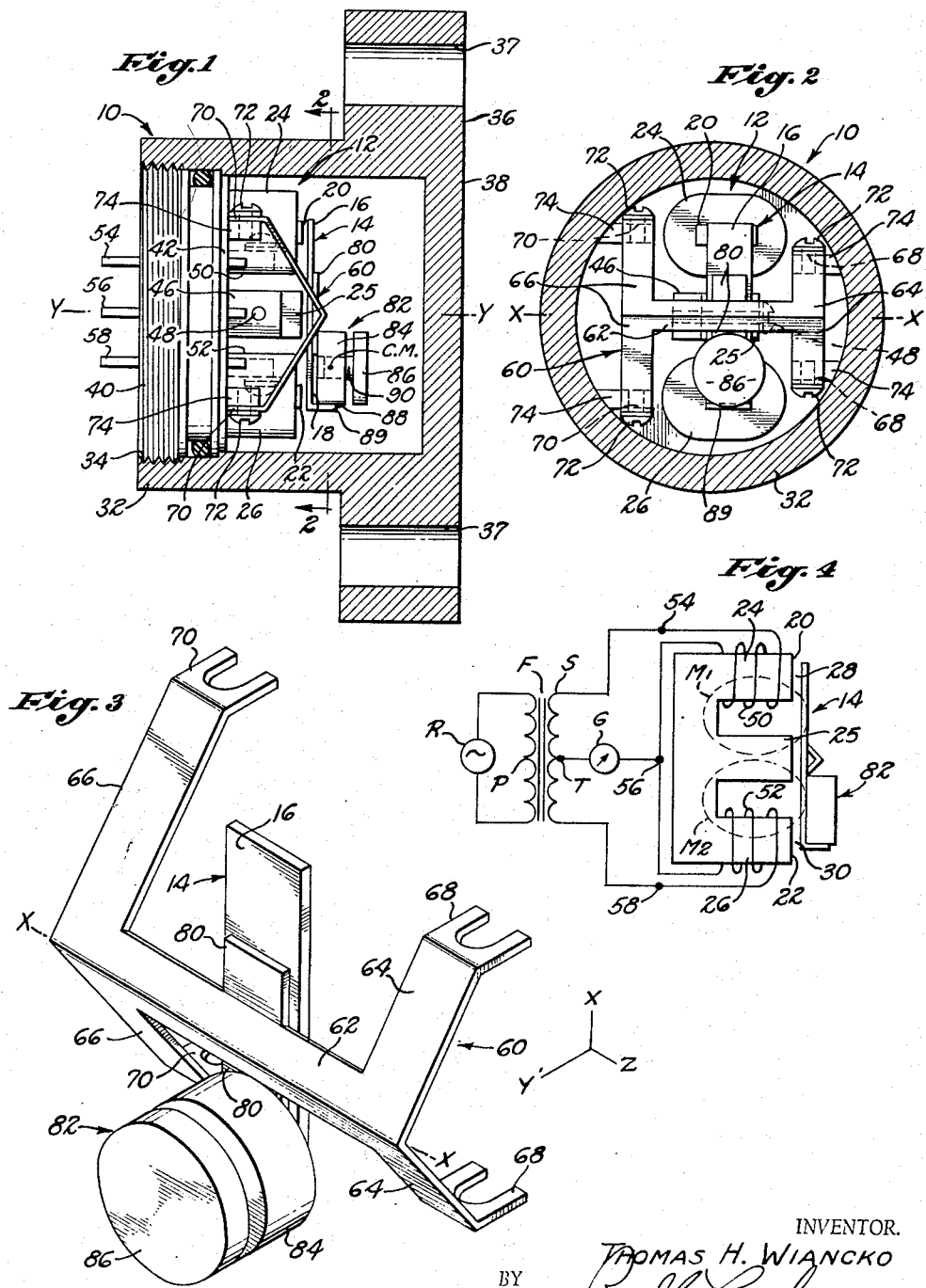
INVENTOR.
THOMAS H. WIANCKO
BY
ATTORNEY.

Patented Apr. 13, 1954

2,675,525

UNITED STATES PATENT OFFICE 2,675,525

ACCELEROMETER

Thomas H. Wiancko, Altadena, Calif.

Application June 25, 1951, Serial No. 233,268

11 Claims. (Cl. 336—30)

My invention relates to improvements in vibration measuring devices and more particularly to an improved accelerometer of the variable reluctance type.

An accelerometer of the type to which my invention is particularly applicable employs an armature resiliently mounted in such relationship to a pair of pole tips that two gaps are formed, the dimensions of which vary in opposite directions when the device is subjected to an external accelerating force. Such an accelerometer is generally constructed in such a way that the changes in the dimensions of the gaps cause the reluctances of two associated magnetic circuits to vary in opposite directions as the accelerometer vibrates. The vibrations in the relative magnitudes of the reluctances are measured to detect the vibrations of the accelerometer.

An object of my invention is to provide an accelerometer with improved means for resiliently supporting the armature.

Another object of my invention is to provide an accelerometer with an armature that rotates about a pivot axis to vary the dimensions of a pair of gaps in opposite directions when the accelerometer vibrates.

Another object of my invention is to provide an improved accelerometer that is responsive to acceleration forces in one selected direction but not to acceleration forces in any direction perpendicular to the selected direction.

Another object of my invention is to provide an improved accelerometer employing a dynamically unbalanced armature with means for varying the distribution of mass of the armature in such a way as to render the device insensitive to acceleration forces in a selected direction.

The foregoing and other objects and advantages of my invention will become apparent from the following detailed description when considered in connection with the accompanying drawing illustrating a single embodiment thereof. In the drawing wherein like reference characters indicate like elements throughout the several views:

Figure 1 is a view, partly in section and partly in elevation, showing a vibration measuring device of the present invention;

Fig. 2 is a view taken on the plane 2—2 of Fig. 1;

Fig. 3 is an isometric view of the spring suspension and armature; and

Fig. 4 is a schematic diagram of a bridge circuit utilizing the vibration measuring device of my invention.

Referring to the drawings, and more particularly to Figs. 1 and 2 there is illustrated a vibration measuring device, or accelerometer, comprising a housing 10 within which is mounted an E-shaped magnetic structure 12 and an I-shaped armature 14. The opposite ends 16 and 18 of the armature 14 are mounted opposite the tips 20 and 22 of the outer legs 24 and 26 of the E-shaped member 12, thereby forming variable air gaps 28 and 30 which vary in opposite directions when the armature rotates about a pivot axis X—X. The center leg 25 is located opposite the pivotal axis X—X. The I-shaped armature 14 comprises a flat elongated piece of soft iron. The E-shaped member 12 consists of a plurality of laminations of soft iron, each lamination having the same E-shape.

The housing 10 comprises a hollow cylindrical body 32 having a mouth 34 at one end and closed at the other end. A base 36 in the form of an outwardly directed flange is provided at the closed end. Holes 37 in the base facilitate mounting the base in direct contact with the object whose vibration is to be measured. The outer surface 38 of the base is flat or otherwise formed or shaped to define the vibration axis Y—Y in a selected direction along which acceleration forces are to be detected and measured. The vibration axis Y—Y is perpendicular to the pivot axis X—X.

The E-shaped member 12 and the armature 14 are supported upon a plug 40 which is threadably secured to the housing 10 at the mouth 34. The E-shaped member 12 is firmly secured to the plug 40, the base or cross-piece 42 being mounted in a recess on the inner side of the plug 40 and the center leg 25 of the E-shaped member 12 being firmly secured by means of a screw 48 to a post 46 projecting inwardly from the plug 40.

With this arrangement two magnetic circuits $M_1$ and $M_2$ are formed as illustrated in Fig. 4. One circuit includes one gap 28, the adjacent U-shaped half of the E-shaped structure and the adjacent half of the I-shaped armature. Similarly, the other circuit includes the other gap 30, the adjacent U-shaped half of the E-shaped structure and the adjacent half of the I-shaped armature. With this arrangement the reluctances of the two magnetic circuits vary in opposite directions, one increasing and the other decreasing, as the armature rotates about the pivot axis X—X. A pair of windings 50 and 52 are firmly mounted upon the respective outer legs 24 and 26 of the E-shaped member 12 linking the two magnetic circuits $M_1$ and $M_2$.

Three contacts 54, 56 and 58 project through the plug 40 and are electrically insulated therefrom. One end of each of the windings 50 and 52 is connected to the outer contacts 54 and 58 respectively. The other ends of the two windings are connected together and to the center contact 56. The two windings 50 and 52 are wound in opposite directions on the legs 24 and 26 so that magnetic fluxes produced by them in the respective legs when a potential is impressed across the outer contacts 54 and 58 oppose each other in the cross-arm 42 but are in the same direction in the center leg. The self-inductances of the two coils vary in opposite directions as the dimensions of the gaps 28 and 30 vary with pivotal movement of the armature 14.

The spring 60 that is employed for mounting the armature 14 pivotally is a dihedral spring member of H-shape in the direction of the vibration axis Y—Y and of V-shape when viewed along the pivot axis X—X.

More particularly, the spring 60 comprises a V-shaped cross-arm 62 having a pair of relatively short legs 64, 64 of equal length extending transversely from one end thereof and a pair of relatively long legs 66, 66 of equal length extending transversely from the other end thereof. Two feet 68, 68 are formed at the outer ends of the short legs 64, 64 and two feet 70, 70 are formed at the outer end of the long legs 66, 66. The four feet 68, 68 and 70, 70 all extend away from the cross-arm 62. The dihedral spring member 60 is formed of a single sheet of spring metal being first cut in the form of an H symmetrical about the cross-bar but having one leg longer than the other. The outer ends of the legs are bent to form the feet 68, 68, 70, 70 and the spring member is bent along the line of symmetry parallel to the length of the cross-bar to form two plane U-shaped spring members whose bases are joined at the bend line.

The spring is mounted on the inner side of the plug 40 by means of screws 72 which secure the feet 68, 68 and 70, 70 to posts 74 projecting inwardly from the plug 40. The lengths of the posts 74 to which the feet 70 of the long legs are secured project outwardly from the plug less than the posts 74 to which the feet 68 of the short legs are secured so that the apex or bend line X—X of the spring lies in a plane parallel to the surface 38 of the base. The three legs 24, 25 and 26 are of equal length and their tips lie in a plane parallel to the surface 38 of the base 36 that is perpendicular to the vibration axis Y—Y.

A pair of lugs or ears 80, 80 extend outwardly in a common plane from the central portion of the cross-arm 62 of the spring 60 in a plane parallel to the plane of the pole tips 20 and 22. The armature 14 is firmly soldered or otherwise secured to the legs 80.

A mass 82 is secured to the armature 14 on one side thereof in order to unbalance the system dynamically in order to render it sensitive to components of acceleration forces in the direction Y—Y. More specifically, the mass 82 consists of two parts, a main mass 84 and a secondary mass 86. The main mass 84 possesses a flat 88 at one end, which is soldered to a finger 89 projecting transversely of the main body of the armature 14 at one end thereof. The main mass 84 is not soldered to the armature at any other part thereof and is spaced therefrom in order that losses due to eddy currents that might penetrate the main mass 84 are substantially eliminated. The secondary mass 86 is adjustable inwardly and outwardly of the main mass 84 by means of a threaded connection 90 so as to permit adjustment of the position of the center of mass CM along a line parallel to vibration axis Y—Y.

More particularly, the center of mass CM of the mass 82 is so adjusted, taking into account the mass of the armature 14 itself, and the masses of the ears 80 themselves, and the mass of the opposite sides of the cross-arm 62, so that acceleration forces applied in a direction parallel to the plane 38 that is transverse to the vibration axis Y—Y will not cause the armature to rotate about the pivot axis X—X. However, because the system is dynamically unbalanced when the case 10 accelerates in a direction parallel to the vibration axis Y—Y, the armature does rotate about the pivot axis X—X causing the dimensions of the gaps 28 and 30 to vary in opposite directions. When the center of mass CM of the entire inertial system or member including all the masses mentioned above, is so adjusted the normal from that center to the pivot axis X—X is perpendicular to the vibration axis Y—Y.

For precise-work it is desired to adjust the position of the center of mass CM according to the orientation of the accelerometer with respect to the vertical. Thus, for example, the secondary mass would be screwed in farther if the accelerometer is to be mounted right side up than upside down. However, it is sufficiently accurate for many practical applications to solder the secondary mass in place if adjusted to provide minimum sensitivity when the vibration axis is horizontal.

Damping of the movement of inertia system is obtained by filling the case 10 with oil or in any other conventional manner. Expansion and contraction of the body of oil may be accomplished by providing a small air bubble or by other means such as that described and claimed in my copending patent application Serial No. 233,269, filed June 25, 1951, now Patent No. 2,618,776.

The accelerometer hereinabove described is connected in a bridge circuit such as that illustrated in Fig. 4, in order to indicate or measure acceleration in the direction Y—Y. This bridge circuit is formed by connecting the outer ends of a secondary S of a transformer F to the two outer terminals 54 and 58 and also connecting a measuring circuit G between the central terminal 56 and a center tap T on the secondary winding S. To complete the bridge circuit, a source R of A. C. voltage is connected across the primary winding P of the transformer F. With this bridge circuit the measuring circuit G indicates zero output when the accelerometer is stationary or moving with a constant velocity, but indicates accelerations and variations in accelerations when the accelerometer is subjected to acceleration in a direction parallel to the axis Y—Y by the object to which it is attached. Various types of metering circuits G are well-known in the art that are capable of indicating accurately the variations in acceleration of the pickup. Some of these include connections to the source A. C. though no such connections are illustrated here. In any event it is to be noted that the measuring circuit G indicates the acceleration of the pickup because the self-inductance of one winding 50 varies in one direction and the self-inductance of the other winding 52 varies in the opposite direction when the armature 14 rotates about the pivot axis X—X causing the dimensions of the gaps 28 and 30 to vary by equal and opposite amounts.

The accelerometer is made insensitive to accelerations or vibrations occurring in a direction parallel to the plane 38 not only by locating the center of mass CM of the inertial member in the manner explained above, but also by virtue of the relatively high stiffness of the spring 50 along various directions parallel to the plane 38. Maximum stiffness in a direction parallel to the length of the armature 14 may be produced by forming the spring 60 with the legs 64 and 66 on one side thereof in a plane perpendicular or nearly perpendicular to a plane in which the other legs 64 and 66 are located. In practice it is found that satisfactory rigidity may be achieved as long as the planes in which the legs are arranged form an angle roughly approximating a right angle that is an angle between, say, about 60° to 120°.

As the armature 14 rotates in any particular direction about the pivot axis X—X in response to vibrations of the case 10, legs of the spring on one side of the pivot axis X—X flex in one direction, say, inwardly, while legs of the spring on the opposite side of the pivot axis X—X flex in the opposite direction, say, outwardly.

It is to be understood that the terms perpendicular, parallel, and the like used in the specification and in the claims are not to be taken in their strict geometrical sense, especially since the relative orientation of some of the parts vary while the accelerometer is vibrating, and also especially since deviations from exact parallelism and perpendicularity are permissible without departing from the main principles of my invention.

From the foregoing description it will be apparent that I have provided an improved accelerometer that is sensitive to vibrations in a selected direction and insensitive to vibrations in other directions, and that I have achieved this result by providing an arrangement in which a dynamically unbalanced armature is mounted for rotation about a pivot axis. While I have described my invention in connection with a single embodiment thereof in which the movement of the armature is detected by means of coils mounted on the outer legs of an E-shaped magnetic structure, it will be apparent that other means may be employed for detecting and measuring the rotation of the armature and the changes in the relative magnitudes of the reluctance of magnetic circuits associated with opposite ends of the armature. Furthermore, it will be understood that various changes which will now suggest themselves to those skilled in the art may be made in the material, form, and details of construction and arrangements of the various elements of the accelerometer without departing from the spirit of my invention. In addition, it will be clear that though my invention has been described with particular reference to an accelerometer it is also applicable to other types of vibration and force detectors. For example, my accelerometer is also suitable for measuring angular acceleration while being rendered insensitive to linear accelerations in all directions by dynamically balancing the inertia member as by attaching equal masses on opposite ends of the armature. I therefore do not wish to be limited to the specific form of my invention shown and described herein but intend to claim all forms thereof utilizing the principles of my invention.

I claim as my invention:

1. In a measuring device, a base member; a dihedral spring member comprising an H-shaped element formed with two U-shaped sections, the portions of each leg of the H-shaped element and the portion of the cross-bar in each section all lying in the same plane, the two planes formed intersecting along a line parallel to and adjacent a pivot axis, the outer ends of said legs being secured to said base member; a pair of ears extending outwardly from opposite sides of said cross-bar, said ears lying in the same plane; a bar-shaped inertia element secured to said ears; an auxiliary mass member secured to said bar-shaped member on one side of said bend line, said mass member and said bar-shaped member together comprising a dynamically unbalanced inertia member that oscillates about said pivot axis when said base is vibrated in a direction normal to said pivot axis; and means responsive to angular movement of said inertia member about said pivot axis.

2. In a measuring device, a base member; a magnetic structure having a pair of mutually spaced pole tips mounted on said base member, said pole tips being arranged in two magnetic circuits, said pole tips lying in a plane normal to said vibration axis; a dihedral spring member comprising an H-shaped element formed with two U-shaped sections, the legs of the H-shaped element and the portion of the cross-bar in each section all lying in the same plane, the two planes thus formed intersecting along a line parallel to and adjacent to a pivot axis, the outer ends of said legs being secured to said base member, said spring member also comprising a pair of ears extending outwardly from opposite sides of said cross-bar, said ears lying in a plane parallel to said normal plane; an armature member composed of ferro-magnetic material, said armature member having a main relatively long portion secured to said ears whereby the ends of said armature form gaps with the respective pole tips, said armature member also having a relatively short finger extending at right angles thereto on the bendline side of said armature; an auxiliary mass member secured to said finger but not to the long portion of said armature, said mass member and said bar-shaped member together forming a dynamically unbalanced inertia member that oscillates about said pivot axis when said base is vibrated in a direction normal to said pivot axis; and coils linking the respective magnetic circuits.

3. In a measuring device, a base member; an elongated inertia member; resilient means mounted on said base member for supporting said inertia member for rotation about a pivot axis, said resilient means comprising a pair of leaf spring members, the planes of which are parallel to said pivot axis, said planes forming a dihedral angle whereby one leaf spring member flexes in one direction and the other leaf spring member flexes in the opposite direction as said device vibrates in a direction normal to said pivot axis, said inertia member being dynamically unbalanced about said pivot axis, whereby said inertia member oscillates about said pivot axis when said device is vibrated in said direction, and means responsive to the angular movement of said inertia member about said pivot axis.

4. A vibration measuring device as defined in claim 3 wherein said dihedral angle roughly approximates a right angle.

5. In a measuring device, a base member; an elongated inertia member; resilient means mounted on said base member for supporting said inertia member for rotation about a pivot axis; a mass secured to said inertia member and adjustably positioned thereon whereby the center of mass of said mass and said inertia member may be adjusted in a direction normal to said pivot axis and parallel to the direction of the component of the vibration being measured, said inertia member being dynamically unbalanced about said pivot axis when said device is vibrated in said direction, and means responsive to the angular movement of said inertia member about said pivot axis.

6. In a measuring device, a base member; a dihedral spring member comprising an H-shaped element formed with two U-shaped sections, the portions of each leg of the H-shaped element and the portion of the cross-bar in each section all lying in the same plane, the two planes formed intersecting along a line parallel to and adjacent a pivot axis, the outer ends of said legs being secured to said base member; a pair of ears extending outwardly from opposite sides of said cross-bar, said ears lying in the same plane; a bar-shaped inertia element secured to said ears; and means responsive to angular movement of said inertia member about said pivot axis.

7. In a measuring device, a base member; a magnetic structure having a pair of mutually spaced pole tips mounted on said base member, said pole tips being arranged in two magnetic circuits, said pole tips lying in a plane normal to a direction along which a component of vibration is to be measured; a dihedral spring member comprising an H-shaped element formed with two U-shaped sections, the legs of the H-shaped element and the portion of the cross-bar in each section all lying in the same plane, the two planes thus formed intersecting along a line parallel to and adjacent to a pivot axis, the outer ends of said legs being secured to said base member, said spring member also comprising a pair of ears extending outwardly from opposite sides of said cross-bar, said ears lying in a plane parallel to said normal plane; an armature member composed of ferro-magnetic material, said armature member having a main relatively long portion secured to said ears whereby the ends of said armature form gaps with the respective pole tips; and coils linking the respective magnetic circuits.

8. In a measuring device, a base member defining a vibration axis; an unbalanced elongated inertia member; resilient means mounted on said base member for supporting said inertia member for rotation about a pivot axis transverse to said vibration axis, said resilient means comprising a pair of leaf spring members rigidly attached to said inertia member intermediate its ends, the planes of said spring members being parallel to said pivot axis, said planes forming a dihedral angle whereby one leaf spring member flexes in one direction and the other leaf spring member flexes in the opposite direction as said device vibrates along said vibration axis; and means responsive to angular movement of said inertia member about said pivot axis.

9. In a measuring device, a base member; a dihedral spring member comprising an H-shaped element formed with two U-shaped sections, the legs of the H-shaped element and the portion of the cross-bar in each section all lying in the same plane, the two planes thus formed intersecting along a line parallel to and adjacent to a pivot axis, the outer ends of said legs being rigidly secured to said base member; an inertia member secured to said cross bar; and means responsive to angular movement of said inertia member about said pivot axis.

10. In a measuring device; a base member; an elongated inertia member; a dihedral spring member rigidly attached to said inertia member intermediate the ends of the latter, said dihedral spring member comprising two sections that intersect along a line adjacent the axis about which said inertia member rotates; and means responsive to angular movement of said inertia member about said pivot axis.

11. In a measuring device; a base member; an elongated inertia member; a pair of flat spring elements supporting said inertia member, the planes of said spring elements intersecting along a line adjacent an axis of rotation, the outer ends of said spring elements being rigidly secured to said base member, said inertia member being rigidly attached to the inner ends of said spring members for rotation about said axis, the points of attachment being adjacent said axis; and means responsive to angular movement of said inertia member about said pivot axis.

References Cited in the file of this patent
UNITED STATES PATENTS

| Number | Name | Date |
| --- | --- | --- |
| 2,293,502 | Hermann | Aug. 18, 1942 |
| 2,398,666 | Reason | Apr. 16, 1946 |
| 2,440,342 | Mayne | Apr. 27, 1948 |
| 2,552,722 | King | May 15, 1951 |